Sept. 28, 1954  J. J. BERGER  2,689,987
COUPLING DEVICE FOR BUILDING STRUCTURES
Filed Feb. 4, 1952
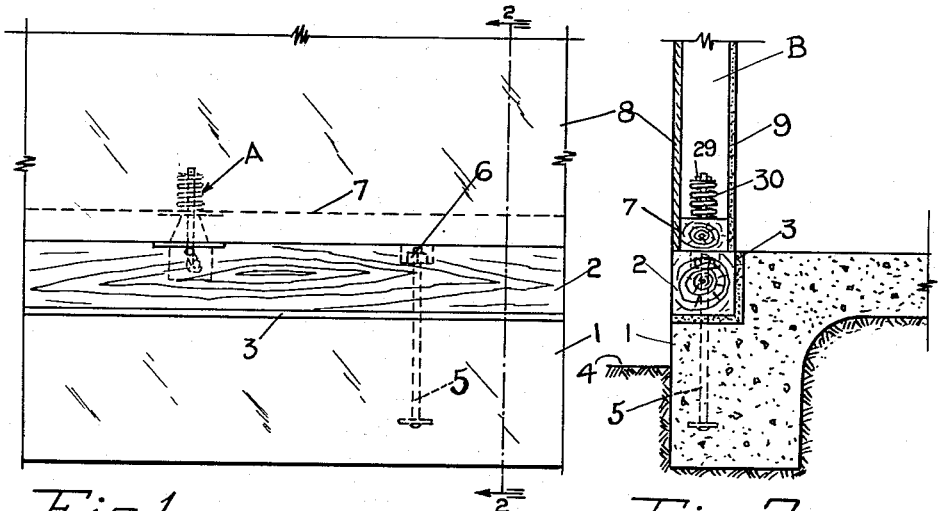
Fig.1.  Fig.2.
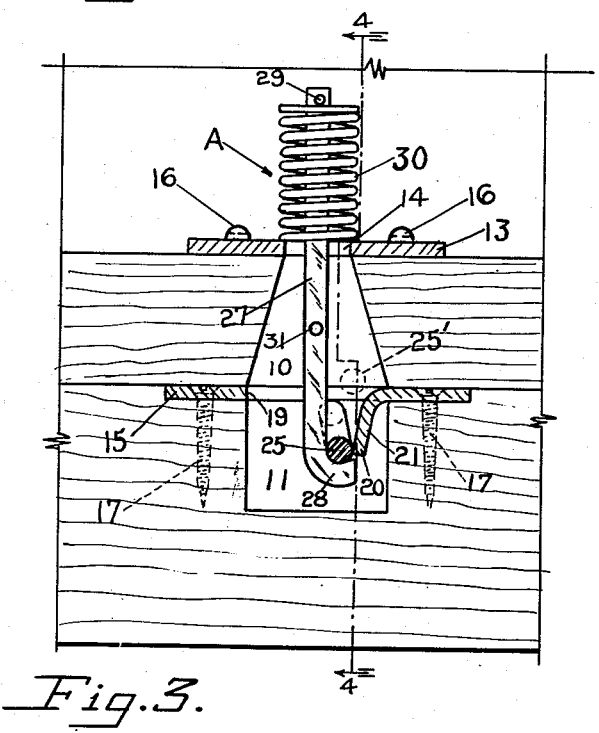 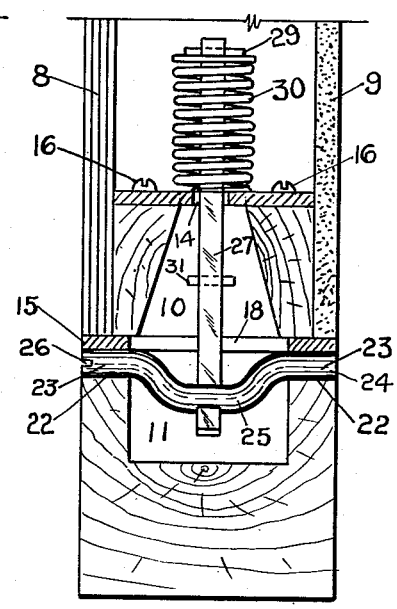
Fig.3.  Fig.4.
INVENTOR.
JOSEPH J. BERGER.
BY
*Shrev, Crowe & Gordon*
ATTORNEYS.

Patented Sept. 28, 1954

2,689,987

UNITED STATES PATENT OFFICE 2,689,987

COUPLING DEVICE FOR BUILDING STRUCTURES

Joseph J. Berger, Miami, Fla.

Application February 4, 1952, Serial No. 269,809

6 Claims. (Cl. 20—2)

The present invention relates to certain improvements in prefabricated or knock-down building structures, such as prefabricated dwelling houses, or the like, and more particularly the invention relates to fastening devices for interlocking together structural units of such prefabricated assemblies in a manner which will produce strong connections between the component parts of the units while being inexpensive to manufacture and install, as well as being capable of rapid assembly.

One of the difficulties encountered in the assembly of prefabricated dwellings or other knock-down type of buildings is to render them proof against entry of weathering influences, such as wind, rain, snow, or other forms of moisture. A quick speed of assembly especially for the rapid construction of living quarters and shelters in disaster areas is also essential for this type of building structure.

The present invention provides improvements in the usual types of housing structures to which the present developments relate, it being an object of the invention to provide an inexpensive and easily operated interlock between components of the building assembly which will provide strength to the completed structure, and more importantly will continuously maintain the components in tight association regardless of any changes in dimensions of the component parts of the structure resulting from swelling or shrinkage thereof, under the influence of weather conditions, thereby maintaining continuously a high resistance against ingress of weather conditions or other external influences, and which will assure continuous structural strength between the component parts of the assembled structure, together with continuously tight joints under all, even extreme, service conditions for rendering the assembled structure highly resistant or proof against, entry of air, water, or other objectionable influences.

Another important object of this invention is the provision of an interlocking coupling device comprising a tensioned locking bar means in connection with one of the building components or objects to be coupled and a locking element in connection with the other or base member to be coupled and an adjustable eccentric crank pin mounted in said base member in engagement with said bar means and operable to increase the tension on said bar and locking parts to effect a water tight jointure and in a manner whereby stresses tending to separate the coupled members increase the binding engagement of the locking parts, said tensioning means compensating for expansion and contraction of the coupled elements by reason of changing in weather conditions to continuously maintain an air and water tight jointure.

Further objects and advantages of the invention will become apparent as the description proceeds and the features of novelty will be pointed out in greater particularity in the appended claims.

The improvements represented by the present developments relate generally to an improved interlocking device, the use of which produces the advantages which have been mentioned above, among others as will become hereinafter apparent, reference being made to the accompanying drawings for further understanding and clarification of the structural features presented by the present improved contribution to the art of prefabricated or knock-down building structures, it being understood that the illustrated structural features represent an illustrative or exemplary embodiment thereof, which may be varied more or less substantially as may be determined by the character of a specific installation or service conditions, while nevertheless preserving the above-stated objects and advantages of the above inventive contribution. The improvements represented by the present invention are illustrated, however, in the accompanying drawings, in which Fig. 1 is a fragmentary elevational view of an outer wall of a prefabricated or knock-down type of building structure embodying the improved interlocking instrumentalities of the present invention.

Fig. 2 is a vertical sectional view through the outer wall assembly of Fig. 1, the view being taken on the line II—II of Fig. 1, looking in the direction of the arrows.

Fig. 3 is a further fragmentary sectionalized view partially in elevation of the assembly illustrated in Figs. 1 and 2, but emphasizing on an enlarged scale the structural features of the improved interlocking devices of the present invention, which are shown in locking position.

Fig. 4 is a vertical sectional view partly in elevation taken on the line IV—IV of Fig. 3, looking in the direction of the arrows.

Referring more particularly to the drawings, the reference numeral 1 represents a fragment of foundation for a prefabricated, knock-down type of building construction contemplated by the improvements of this invention. The foundation 1 suitably is composed of concrete, or it may be of equivalent foundation material of a character which will become suggested to one readily skilled in the art. A foundation sill 2 is provided, which when installed in the foundation 1 extends lengthways of the foundation along the upper and outer corner thereof, the sill 2 being adapted to carry wall panels of a building structure which will be referred to hereinafter. This foundation sill 2 conveniently is a wooden sill, and by way of example it may be a 4 by 4 sill of yellow pine. There is provided between the sill 2 and the foundation 1 a moisture- and water-proof expansion joint 3, which permits expansion and contraction of the sill without allowing water or moisture from the foundation 1 reaching the sill 2 with attendant destruction of durability of the sill through action of such moisture. The expansion joint 3 may be composed of asphalt or other moisture-proof composition which by blocking of passage of moisture to the sill, inhibits the sill against rotting. It will be observed that the sill 2 is positioned above the grade line 4 of the soil in which the foundation is laid. Spaced anchor bolts 5 anchor the sill 2 to the foundation 1, while permitting disassembling of the sill from the foundation by removal of nuts 6 on the upper ends of the anchor bolts. It will be understood that as many anchor bolts are provided as are required for any given installation.

Positioned on the top side of the sill 2 and extending lengthways thereof is a bottom panel beam 7, which is somewhat smaller in cross-sectional area than the sill 2 and forms a bottom spacer and mounting for securing the wall panel surfaces 8 and 9 in properly spaced and parallel relationship, the plywood surface 8 being the exterior surface and the plaster board surface 9 being the interior surface and which structure forms the wall panel B. These surface members are secured to the spacer beam 7 in any suitable manner, and the beam 7 is interlocked to the sill 2 by the interlocking device A which constitutes an important improvement of the present invention.

For the reception of these locking instrumentalities, the beam 7 and the sill 2 are provided with any desired number of spaced, but registering recesses 10 and 11.

In connection with a respective device A the recess is formed in the beam 7 and open therethrough, while the recess 11 is formed in the sill 2. The recess 10 expands downwardly from the top of the beam 7 to its juncture with the recess 11 in the sill 2 and a hard, metallic wear plate 13, having a slot aperture 14 therethrough is secured to the top of the beam 7 above opening 10. An interlocking plate 15 is interposed between the said panel beam 7 and the sill 2 at the juncture between the aperture 10 in the panel beam 7 and the recess 11 in the sill 2. The plate 13 is secured to the panel beam 7 by suitable fastening means such as screws 16, and the plate 15 is set in and secured to the sill 2 by similar fastening means, such as screws 17.

The interlocking plate 15 is provided with a hole or opening 18 therethrough, which registers with the junction between the opening 10 in the panel beam 7 and the recess 11 in the sill 2. The hole 18 has oppositely disposed edges, one of which, indicated at 19, is approximately flush with the said jointure between opening 10 and recess 11, the diametrically opposite portion of the edge, indicated at 20, extends partially over the recess 11 and is bent downwardly into said recess, as shown at 21, to form a locking element which will be described in greater detail hereinafter.

The sill 2 immediately below the plate 15 on opposite sides of the recess 11 is formed with aligned grooves 22. These grooves 22 receive end portions 23 of an eccentric pin 24 having an eccentric crank portion 25 intermediate the end portions 23, and one of which said ends is formed with a screw slot 26 adapted for receiving a tool for moving the eccentric crank or throw portion 25 from inoperative to operative locking position.

Cooperating with the eccentric pin 24 and the locking edge 20 of intermediate or interlocking plate 15, is a locking bar 27, which extends through the opening 10 in the panel beam 7 and into the recess 11 in the sill 2, the bar 27 having a hooked lower end 28 which engages the lower surface of eccentric crank portion 25 of the locking pin 24, when said crank portion 25 is turned downwardly as shown in Figs. 3 and 4 by a tool inserted in the screw slot 26. This locking bar 27 has a top pin 29 extending therethrough which forms an upper retaining abutment for a coil spring 30, the inside diameter of which spring is greater than the diameter of the slot 14 in the wear plate 13, so that the spring 30 is retained and compressed between the plate 13 (which preferably is a steel plate) and the pin 29, the spring 30 being compressed to a predetermined tension so that it urges the bar 27 upwardly against the eccentric locking pin 24, the eccentric crank portion 25 being turnable from inactive position 25', shown by dotted lines in Fig. 3, to the full line locking position shown in Figs. 3 and 4. The spring 30 clamps the hooked end portion 28 of the bar 27 against the eccentric crank portion 25 of the pin 24 and the locking edge 20 of plate 15 when said portion 25 is moved into locking position slightly beyond center (Fig. 3) so that the panel beam 7 and panel B are locked tightly against the sill 2, and any force tending to separate said panel and sill effects a stronger binding of the locked parts. Said spring 30 also compensates for any changes in dimensions between the panel assembly and the sill so as to maintain the joint continuously tightly sealed against ingress of moisture, water, or any other extraneous potentially damaging influences. As has been indicated above, the illustrated locking devices are repeated as often as may be needed to maintain a continuously tight joint between the panel B and the sill 2. It will be noted that the locking bar 27 is provided with a pin 31 to prevent separation and loss of the plate 13 during handling and shipment of the device A.

The manner of assembling and disassembling the parts will be apparent from the drawings and requires no explanation, and it may be effected by the use of common and conventional tools that are readily available. The herein described and illustrated embodiment of the improved construction represents a preferred form because of the simplicity of its fabrication and installation, in addition to features of flexibility and continuous positive action to produce a tight and strong interlock, which will be as permanent in character as the building structure itself in which the interlocking instrumentalities are installed. However, it will be apparent to one skilled in the art to which this invention relates that structural details may be modified desirably for specified installations without departing from the inventive concept, and accordingly it will be understood that it is intended and desired to embrace within the scope of this invention such modifications and changes as may be necessary or desirable to adapt it to varying conditions and uses, as defined by the appended claims.

What is claimed is:

1. A building construction which comprises the combination with a foundation structure, of a sill mounted lengthways of the foundation structure, a moisture-proof expansion joint intermediate the sill beam and foundation structure for preventing access of moisture from the foundation structure to the sill, a wall panel carried by the sill and including a panel beam engaging the sill longitudinally thereof, and locking means interlocking the panel beam and sill, the locking means comprising a locking bar extending through the panel beam into a recess provided therefor in the sill, a locking plate in the recess, an eccentric pin extending transversely through the sill and having an eccentric locking crank portion cooperating with the locking plate, the said bar having an end defining a hook portion engaging the locking crank portion, and a coil spring enclosing an upper end portion of the locking bar and bearing against the said upper end portion of the locking bar and the panel beam and continuously urging the hook end portion of the locking bar into engagement with the eccentric crank pin and locking plate for securing the panel beam and sill into tight engagement with each other.

2. A building construction comprising the combination with a foundation structure, of a sill mounted lengthways of the foundation structure, a wall panel assembly mounted on the sill and comprising a panel beam, the said panel beam having an aperture extending substantially vertically therethrough and registering with a recess in the sill, a locking bar extending through the aperture and into the said recess and having an end portion projecting above the aperture and panel beam, abutment means on the said end portion of the locking bar, a locking pin extending transversely through the sill and having an eccentric crank portion in the recess in the sill, the said locking bar terminating in the recess in a locking end engaging the eccentric crank portion of the locking pin, means on the locking pin for enabling the pin to be turned for effecting an adjusted contact between the said eccentric crank portion of the locking pin and the locking end of the said bar for effecting a tight interlock between the panel assembly and the sill, a coil spring enclosing the projecting end portion of the locking bar and retained between the abutment means on the said end portion of the locking bar and the panel beam for continuously urging the locking end of the said locking bar against the eccentric crank portion of the locking pin and compensating for changes in dimensions of the panel beam and sill for continuously maintaining a tight interlock therebetween.

3. A building construction comprising the combination with a foundation structure, of a sill beam mounted on the foundation structure, a wall panel assembly mounted on the sill beam and comprising a panel beam and wall panel members secured laterally to the panel beam, the said panel beam having an aperture extending substantially vertically therethrough and registering with a recess in the sill beam, a wear plate secured to the panel beam having an aperture therethrough, a locking bar extending through the said apertures and into the recess in the sill beam, and having an end portion projecting above the panel beam, abutment means on the said end portion of the locking bar, a locking pin extending transversely through the sill beam and recess therein and having an eccentric crank portion in the said recess, the said locking bar terminating in the recess in a hook engaging the eccentric crank portion of the locking pin, an interlocking plate mounted on the sill beam intermediate the panel beam and the sill beam, and having an aperture therethrough registering with the said recess in the sill beam, a portion of the said interlocking plate depending into the said recess to define a locking abutment for the eccentric crank portion of the locking pin and the locking hook of the locking bar in engagement therewith, means on the said locking pin for effecting turning of the eccentric crank portion thereof between inactive position and locking position in engagement with the hook portion of the locking bar, a coil spring enclosing the projecting end of the locking bar and compressed between the said abutment means and the wear plate on the panel beam, the coil spring being intermediate the wall panel members and continuously urging the hook portion of the locking bar into engagement with the eccentric crank portion of the locking pin and the locking abutment in the recess, for firmly interlocking the panel assembly and the sill beam independently of variations in dimensions thereof incident to swelling and contraction of the beams.

4. A coupling assembly for interconnecting a pair of elements having engaging surfaces, one of said elements being provided with an aperture-recess extending therethrough, the contiguous element being provided with a recess forming a well registering with said aperture, said coupling assembly comprising a locking bar extending through the aperture and into the said well and having an end portion projecting beyond the apertured element, abutment means on the projecting end of the locking bar, a locking pin extending transversely through the contiguous element and having an eccentric crank portion within said well, the said locking bar terminating in said well in a locking end engaging the crank portion of the locking pin, additional locking means in said well cooperating with locking end of said bar and the crank portion of said locking pin, means on the locking pin for enabling the pin to be turned for effecting an adjusted contact between the said eccentric crank portion of the locking pin and the locking end of the said bar for effecting a tight interlock between the contiguous elements, a coil spring enclosing the projecting portion of the locking bar and retained between the abutment means on the said end portion of the locking bar and the apertured element for continuously urging the locking end of the said locking bar against the eccentric crank portion of the locking pin and said additional locking means and compensating for changes in dimensions of the said elements for continuously maintaining a tight interlock therebetween.

5. A coupling assembly for interconnecting a plurality of elements having engaging surfaces provided with registering recesses one of the elements being provided with an aperture extending therethrough, the contiguous element being formed with a registering recess, said coupling assembly comprising a locking bar extending through said aperture and into said recess, a locking plate means in said recess, an eccentric pin extending transversely through said recess and element, said pin having an eccentric locking crank portion cooperating with the locking plate means, the said bar having an end defining a hook portion engaging the said locking crank portion, and a coil spring enclosing an upper end portion of the locking bar and bearing against the said upper end portion of the locking bar and the apertured element and continuously urging the hook end portion of the locking bar into engagement with the eccentric crank pin and locking plate means for securing the elements into tight engagement with each other.

6. A coupling assembly for interconnecting a pair of elements having engaging surfaces provided with registering recesses, the recess on one of the elements having a vertical wall, and the recess in the other element registering at its inner end therewith, a lock plate mounted at the juncture of said recesses in the surface of the element with a locking portion extending into the vertical walled recess, an apertured wear plate mounted on the exposed surface of the other element, an eccentric pin extending transversely through the element and vertical walled recess beneath said lock plate and having an eccentric locking crank portion cooperating with said plate locking portion, means in connection with said pin for operating said crank portion from inoperative to locking positions, a locking bar formed on one end with a hook portion engaging the locking crank portion, the other end extending above said wear plate, a coil spring enclosing the exposed end of said locking bar, abutment means in the upper end of said bar, said coil spring seating against said wear plate and abutment and continuously urging said hook portion of the bar into engagement with the eccentric crank pin and locking plate means for locking the elements into tight engagement with each other.

References Cited in the file of this patent

UNITED STATES PATENTS

| Number | Name | Date |
|---|---|---|
| 1,369,713 | Smith | Feb. 22, 1921 |
| 1,375,402 | McAvoy | Apr. 19, 1921 |
| 1,775,002 | Smith | Sept. 2, 1930 |
| 2,129,932 | Huddleston | Sept. 13, 1938 |
| 2,226,332 | Bacci | Dec. 24, 1940 |
| 2,340,864 | Carpenter | Feb. 8, 1944 |
| 2,483,080 | Wilson | Sept. 27, 1949 |

FOREIGN PATENTS

| Number | Country | Date |
|---|---|---|
| 17,013 | Denmark | Feb. 13, 1913 |